US010345922B2

(12) United States Patent
Chen et al.

(10) Patent No.: US 10,345,922 B2
(45) Date of Patent: Jul. 9, 2019

(54) OFFICE SYSTEM PREDICTION CONFIGURATION SHARING

(75) Inventors: Yen-Fu Chen, Austin, TX (US); John Hans Handy-Bosma, Cedar Park, TX (US); Susan Elise Lee, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2197 days.

(21) Appl. No.: 11/379,610

(22) Filed: Apr. 21, 2006

(65) Prior Publication Data
US 2007/0250765 A1   Oct. 25, 2007

(51) Int. Cl.
G06F 17/00 (2019.01)
G06F 3/023 (2006.01)
G06F 17/24 (2006.01)
G06F 17/27 (2006.01)

(52) U.S. Cl.
CPC .......... *G06F 3/0237* (2013.01); *G06F 17/246* (2013.01); *G06F 17/24* (2013.01); *G06F 17/248* (2013.01); *G06F 17/276* (2013.01); *G06F 17/2735* (2013.01)

(58) Field of Classification Search
CPC .... G06F 3/0237; G06F 17/24; G06F 17/2735; G06F 17/246
USPC ............ 715/257, 259, 267, 220, 219; 6/257
See application file for complete search history.

(56) References Cited

U.S. PATENT DOCUMENTS

| 5,659,766 | A | 8/1997 | Saund et al. |
| 5,771,241 | A * | 6/1998 | Brummel ......... G01R 31/31813 714/733 |
| 6,363,379 | B1 | 3/2002 | Jacobson et al. |
| 6,618,697 | B1 * | 9/2003 | Kantrowitz et al. ............ 703/22 |
| 6,839,682 | B1 | 1/2005 | Blume et al. |
| 7,155,427 | B1 * | 12/2006 | Prothia et al. .................... 707/3 |
| 8,600,916 | B2 | 12/2013 | Chen et al. |
| 2002/0032745 | A1 * | 3/2002 | Honda ................ G06F 16/9574 709/217 |
| 2002/0103831 | A1 | 8/2002 | Iyer et al. |
| 2002/0156816 | A1 * | 10/2002 | Kantrowitz et al. .......... 707/530 |
| 2004/0073874 | A1 | 4/2004 | Poibeau et al. |
| 2005/0050547 | A1 * | 3/2005 | Whittle et al. ................ 719/310 |
| 2005/0114770 | A1 | 5/2005 | Sacher et al. |
| 2005/0240756 | A1 | 10/2005 | Mayer |

(Continued)

OTHER PUBLICATIONS

Craig Stinson and Mark Dodge, Microsoft Office Excel 2003, Publisher: Microsoft Press, Published: Sep. 3, 2003, pp. 147-218, 241-242, and 249-250 (Renumbered as 1-127 in the PDF electronic version of the document).*

(Continued)

*Primary Examiner* — Cesar B Paula
*Assistant Examiner* — David Faber
(74) *Attorney, Agent, or Firm* — Yee & Associates, P.C.; Brian Restauro

(57) ABSTRACT

A computer implemented method, apparatus, and computer usable program code for embedding and importing content prediction instructions. Content prediction instructions are customized. The content prediction instruction is part of content prediction logic. The prediction instruction is embedded in a document in response to receiving a user selection to embed the prediction instruction.

15 Claims, 5 Drawing Sheets

(56) References Cited

U.S. PATENT DOCUMENTS

2006/0242109 A1* 10/2006 Pereira et al. .................. 707/1
2007/0250504 A1 10/2007 Chen et al.

OTHER PUBLICATIONS

Goyvaerts, Jan, "Regular Expression Tutorial—Learn How to Use Regular Expressions", Introduction, verified by Wayback Machines, Aug. 16, 2003, pp. 1-4, retrieved Jan. 13, 2009, <http://web.archive.org/web/20030816015003/http://www.regular-expressions.info/tutorial.html>.

Adelberg, "NoDoSE—A tool for Semi-automatically extracting structured and semistructured data from text documents", ACM SIGMOD Record vol. 27, Issue 2, Jun. 1998, p. 283-294.

Microsoft, "View Tracked Changes" Microsoft Office Excel. pp. 1-4, retrieved Jun. 9, 2009, http://office.microsoft.com/en-us/excel/HP0502038641033.aspx.

Microsoft, "Import Financial Data into Excel from Various Sources", Microsoft Office Excel, p. 1-5, retrieved Jun. 9, 2009.

about.com Spreadsheets, "Customizing Excel 2003 Auto Fill Handle", Microsoft Excel 2003, pp. 1-2 Retrieved Jun. 9, 2009 http://www.spreadsheets.about.com/od/exceltips/qt/auto_fill.htm.

Metha, "Real-life examples of where regular expression played an important role in an excel worksheet", Verified by wayback machine, Oct. 23, 2004, pp. 1-2 http://web.archive.org/web/20041023203422/http://www.tmehta.com/regexp/examples.htm.

Smith, "Excel Basics: Autofill Data" and "Excel Basics: Autofill", page verified by wayback machine to Jun. 16, 2002, pp. 1-5.

Adelberg, "NoDoSe—A tool for Semi-Automatically Extracting Structured and Semistructured Data from Text Documents", ACM SIGMOD, record vol. 27, Issue 2, Jun. 1998, pp. 283-294.

Office Action, dated Aug. 26, 2008, regarding U.S. Appl. No. 11/379,604, 13 pages.

Final Office Action, dated Jan. 21, 2009, regarding U.S. Appl. No. 11/379,604, 14 pages.

Office Action, dated Jun. 19, 2009, regarding U.S. Appl. No. 11/379,604, 17 pages.

Final Office Action, dated Oct. 13, 2009, regarding U.S. Appl. No. 11/379,604, 9 pages.

Notice of Allowance, dated Jul. 31, 2013, regarding U.S. Appl. No. 11/379,604, 9 pages.

* cited by examiner

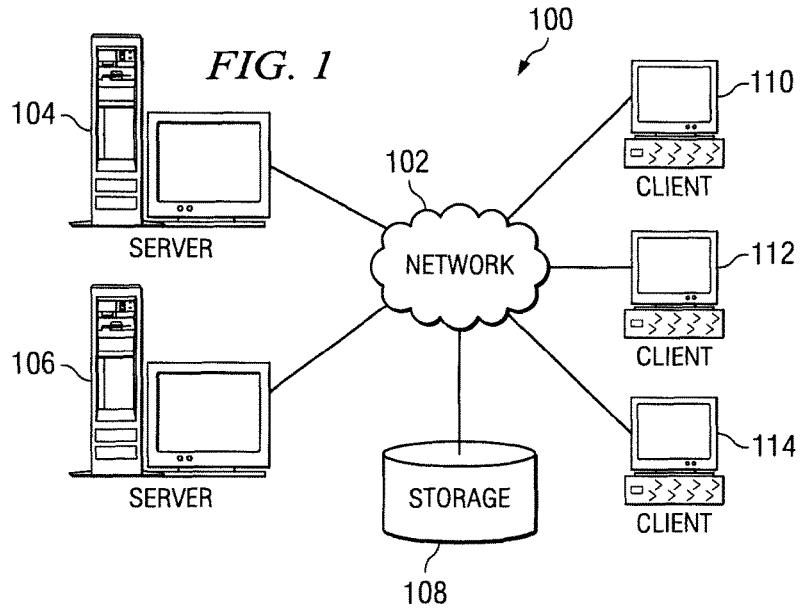

OFFICE SYSTEM PREDICTION CONFIGURATION SHARING

BACKGROUND OF THE INVENTION

1. Field of the Invention

The present invention relates generally to data processing systems, and more particularly to a computer implemented method of content sharing based on regular expression pattern analysis.

2. Description of the Related Art

Data processing systems are used by increasing numbers of businesses and individuals each year. These data processing systems help users to efficiently process data and information. Users often use office software to view, store, edit, and otherwise manage data. Many office software suites provide simple content prediction based on simple, recognized patterns while pasting, formatting, or filling in data. For example, in many spreadsheet programs, if you highlight two cells in a column containing the numbers 1 and 2 and then drag the mouse down, the spreadsheet program will predict that you want the next cell to contain the number 3, 4, and so on.

Users may also use a Find/Replace feature to replace and edit information in a document, but such actions are not dynamic and require time and effort to select each change. Existing content prediction in office software uses simple logic to predict patterns. For example, only simple series of numbers, dates, and times may be predicted without creating a specific program or script. Content prediction saves time when data entry lends itself to serial entry, but current programs integrating content prediction cannot decipher a repetitive, complex action in order to continue the action.

As a result, users are forced to expend more time and effort to effectively manage data. A user may manually input and edit data as needed, requiring significant time. In another alternative, the user may write a macro that evaluates each data type and modifies the cell as required to fit the desired format. This alternative requires more design and scripting knowledge than most users have and may also take significant time. In addition, once created, the macro is only good for the one scenario requiring a new macro for each desired format. Other complex forms of data design and massaging may be used that may be beyond the skill of the average user or are time consuming and inflexible.

Even if a user does take the time to create custom scripts and formats, those customizations are not easily passed to other users directly or in the document. As a result, data that is correctly formatted by one user may be marked as incorrect according to another user's editing program. Recreating the conditions and formats used by one user may be difficult and time consuming as well. In some cases a single format is required forcing the user to manually enter data or talk to the original user about how to format the data correctly.

SUMMARY OF THE INVENTION

The illustrative embodiments provide a computer implemented method, apparatus, and computer usable program code for embedding and importing content prediction instructions. Content prediction instructions are customized. The content prediction instruction is part of content prediction logic. The prediction instruction is embedded in a document in response to receiving a user selection to embed the prediction instruction.

The embodiments also include automatically embedding the content prediction instruction in the content prediction logic. Embedding the content prediction instructions may involve manually embedding the content prediction instruction. The content prediction instruction may be a content prediction instruction based on a regular expression. The content prediction instruction may be any of a type-ahead instructions, typo-fix instructions, user dictionary entries, and custom grammar rules. The content prediction logic may be saved in a template. The template may be saved in the document. The template may be temporarily saved in the document. The template may be temporarily saved in the content prediction logic of another user. The template may be sent to another user.

In importing content prediction, user input is received to select a plan for importing the content prediction instructions in response to receiving a document with content prediction instructions. A determination is made as to whether an instruction in a queue is present in response to receiving a request to import the content prediction instructions. A determination is made as to whether the prediction instruction already exists in content prediction logic in response to the instruction being in the queue. The embodiments determine if prediction instruction conflicts are present in response to the prediction instruction not existing in the content prediction logic. A user update receives a user update input to update the prediction instruction in response to there being prediction instruction conflicts. The prediction instruction is imported in response to receiving the user update input selecting to update the prediction instruction.

The depicted embodiments may also include ignoring the prediction instruction in response to the prediction instruction existing in the content prediction logic. The prediction instruction may be imported in response to there being no prediction instruction conflicts. The prediction instruction may be ignored in response to receiving the user update input selection not to update the prediction instruction.

Importing the content prediction instruction may include adding the prediction instruction to the content prediction logic of the user. Adding the prediction instruction may involve receiving update preferences from the user. The update preferences may allow the user to temporarily accept the prediction instruction for use with the document. The update preferences may allow the user to permanently add the prediction instruction to the content prediction instruction. Adding the prediction instruction may involve copying the prediction instruction from embedded content prediction instructions in the document to the content prediction logic. The update preferences may allow the user to automatically or manually add the content prediction instructions in the document to the content prediction logic.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which illustrative embodiments may be implemented;

FIG. 2 is a block diagram of a data processing system in which illustrative embodiments may be implemented;

DETAILED DESCRIPTION OF THE PREFERRED EMBODIMENT

Figure 3:
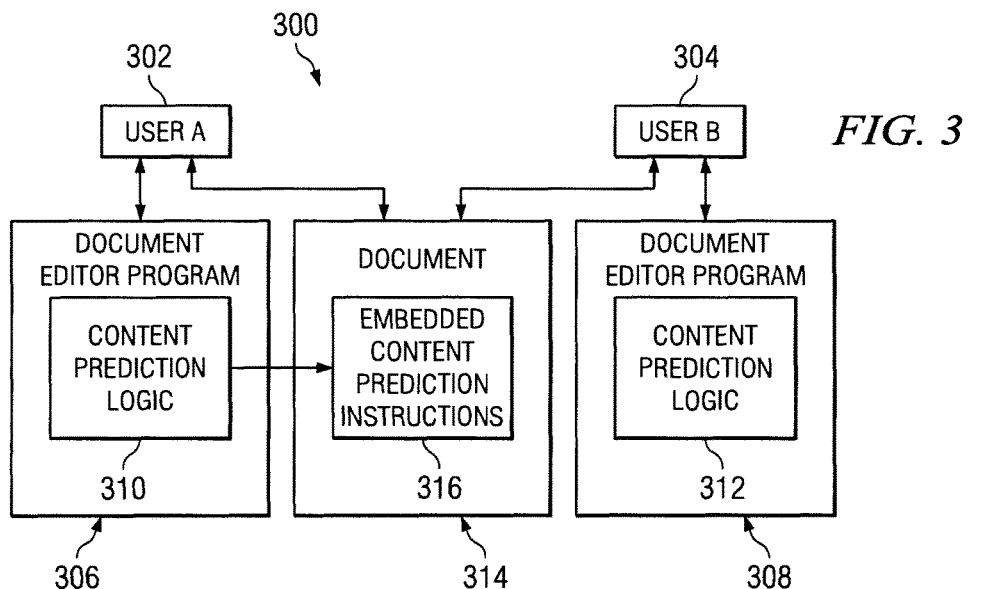
FIG. 3 is a block diagram of an office system for content prediction in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which illustrative embodiments may be implemented. Many modifications to the depicted environments may be made without departing from the spirit and scope of the illustrative embodiments.

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different illustrative embodiments.

With reference now to FIG. 2, a block diagram of a data processing system is shown in which illustrative embodiments may be implemented Data processing system 200 is an example of a computer, such as server 104 or client 110 in FIG. 1, in which computer usable code or instructions implementing the processes for illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of illustrative embodiments may be applied to a multiprocessor data processing system. In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA. Data processing system 200 may be used to present and receive data to the user audibly, visually or in other forms for handicapped users. Data processing system 200 may include a pointing device, monitor, at least one speaker, keyboard, touch screen, microphone and other devices for presenting and receiving data from a user. The pointing device may be a mouse, track ball, joystick, touch pad, or other pointing device.

The illustrative embodiments provide for a computer implemented method, apparatus, and computer usable program code for compiling source code. The methods of the illustrative embodiments may be performed in a data processing system, such as data processing system 100 shown in FIG. 1 or data processing system 200 shown in FIG. 2.

The illustrative embodiments provide a computer implemented method, apparatus, and computer usable program code for content prediction based on regular expression analysis. The illustrative embodiments recognize that current auto-fill features of data processing system are limited to increment, number, letters, and dates. Illustrative embodiments may be used to analyze a cell or string and assign a regular expression pattern that expresses the difference so that other cells may be automatically filled or formatted based on the pattern. A cell is used generically to refer to as text, characters, numbers, a field, a spreadsheet cell, or other logical, text, or data unit. By using content prediction based on regular expression analysis, a user may quickly and easily fill and format data in any number of documents. A document, as used herein, is a spreadsheet, text file, program, database, list, or other collection of data, text, or cells.

For example, the content prediction system may analyze various cells with contents Z1, Y2, X3 to determine that the first alphabetic character of each cell is decreasing and the second numeric character is incrementing. As a result, the content prediction method would fill in the next cell as W4. Such content prediction is currently too sophisticated for existing office systems.

Additionally, a content prediction template that recognizes patterns as developed by one user may be embedded in a document or shared with other users. By sharing content prediction formats, the users may more easily read, store, and access data in a common format.

In some cases, a business or individual may require that the data is formatted in a specified form. By sharing content prediction logic in the form of templates, the users may standardize data for sharing and reporting purposes, saving both time and money. The content prediction template may also incorporate customizations and other preferences and user-customized data, such as type-ahead, typo-fix, user dictionary entries, and custom grammar rules.

Content prediction templates allow a user to embed content prediction logic directly into a document such that the logic may be used by anyone who builds on that document. Alternatively, the template may be explicitly sent to another user or absorbed into another user's content prediction template.

FIG. 3 is a block diagram of an office system for content prediction in which illustrative embodiments may be implemented. Office system 300 includes user A 302 and user B 304. The users may be connected by a network, such as network 102 of FIG. 1. User A 302 and user B 304 each have access to document editor programs 306 and 308.

Document editor programs 306 and 308 are data processing program applications used to store and access information. Document editor programs 306 and 308 may be run by a data processing system, such as data processing system 200 of FIG. 2. More specifically, document editor programs 306 and 308 may be stored in a hard drive, such as hard disk drive 226 and loaded by an operating system into a memory, such as main memory 208 for execution by a processor, such as processing unit 206 all of FIG. 2.

Document editor programs 306 and 308 may be programs such as Microsoft Word, Microsoft Excel, Microsoft PowerPoint, Microsoft Access, Lotus SmartSuite, Openoffice.org Writer, Sun Microsystems StarOffice, Software602 PC Suite, Corel WordPerfect, Apple Pages, and AbiWord to name a few. In another illustrative embodiment, user A 302 and user B 304 may use a network to access a shared version of document editor programs 306 and 308.

Document editor program 306 includes content prediction logic 310. Content prediction logic 310 contains information for expressive content prediction. Regular expression pattern analysis for content prediction involves comparing differences within a series of selected cells or change to those cells and assigning a regular expression that matches the values in a series. Upon determining the regular expression that describes the differences, content prediction logic 310 predicts what comes next in the series. The prediction may be applied for as many iterations as the user specifies. The user selection of cells may be made using an input device, such as a mouse. For example, the user may right click the mouse to select which cells are to be filled or formatted based on content prediction logic 310.

Content prediction formats and preferences may be established automatically by the user or by the designer of document editor program 306. Content prediction logic 310 is individualized for user A 302. Document editor program 308 may also include content prediction logic 312 individualized for user B 304.

In one example, document editor program 306 may be used to create, edit, and view document 314. Document 314 may include embedded content prediction instructions 316. Embedded content prediction instructions 316 describe the content prediction format for the cells of document 314. Embedded content prediction instructions 316 may be derived directly from content prediction logic 310 or may be specifically created or customized while creating and editing document 314.

Content prediction logic 310 and embedded content prediction instructions 316 may include expressive content prediction, type-ahead, typo-fix, user dictionary entries, automatic change, and custom grammar rules.

Because document 314 includes embedded content prediction instructions 316, user B 304 may immediately access and edit document 314 using content prediction logic 312 included in embedded content prediction instructions 316. As a result, user B 304 may add data to document 314 using the embedded content prediction format so that the data is uniform throughout document 314 without additional effort by user B 304.

In another embodiment, user B 304 may specifically select to automatically add embedded content prediction instructions 316 to content prediction logic 312. The user may select to automatically add all instructions or may add instructions by type to content prediction logic 312. The user may also manually select which portions of embedded content prediction instructions 316 to accept by individual instruction or type.

Figure 4:
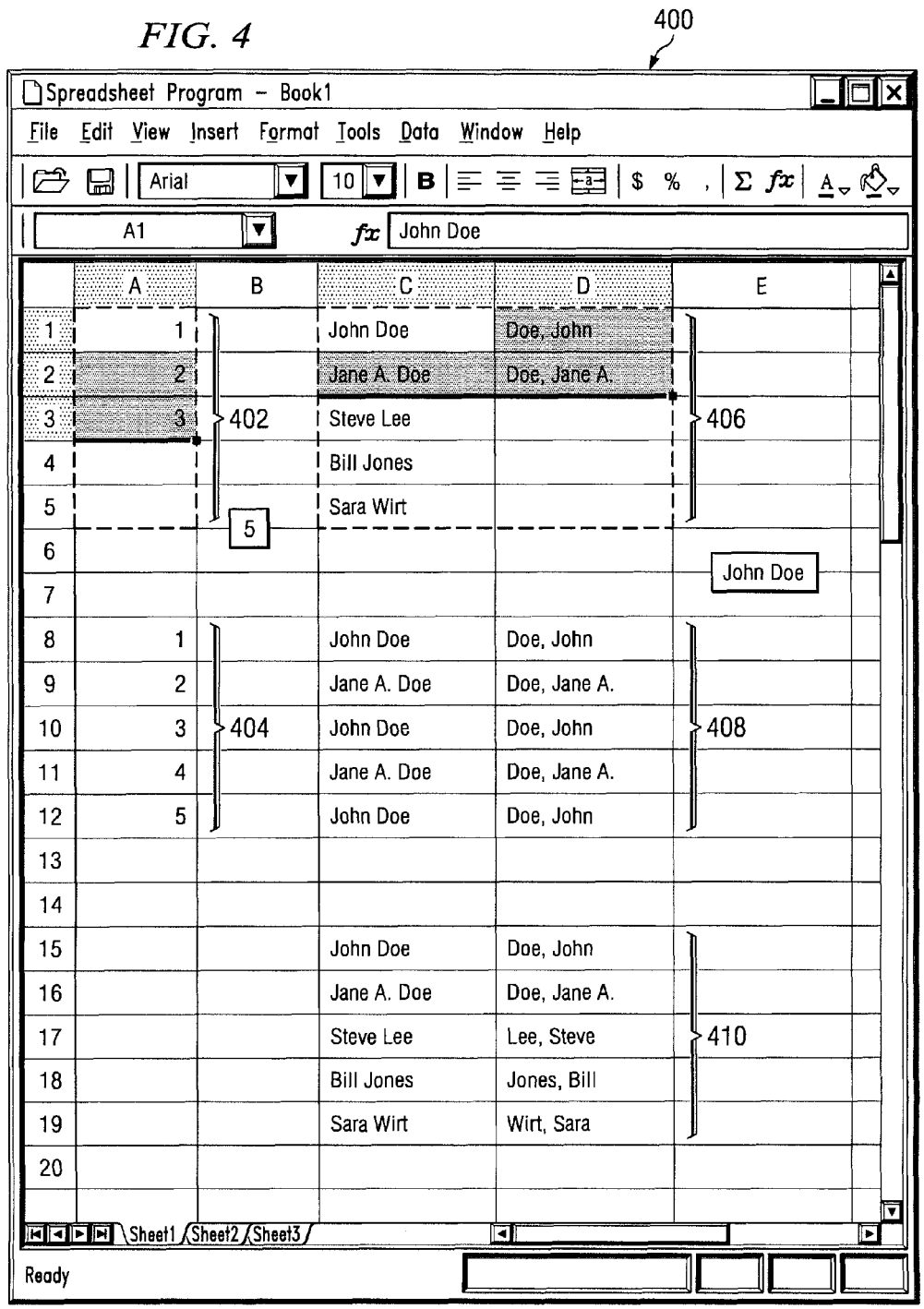
FIG. 4 is an exemplary screenshot for content prediction based on regular expression pattern analysis in accordance with an illustrative embodiment.

FIG. 4 is an exemplary screenshot for content prediction based on regular expression pattern analysis in accordance with an illustrative embodiment. Screenshot 400 is a document, such as document 314 of FIG. 3. Screenshot 400 may be edited by a user, such as user A 302 using a document editor, such as document editor programs 306 and 308 all of FIG. 3.

Section 402 shows current uses of the simple auto-fill feature. The user highlights cells A1:A3 and then drags the pointer down two cells which correctly auto-fills the numbers 4 and 5 as shown in section 404 of cells A8:A12. Simple auto-fill features are limited to very simple series such as numbers, alphabetic, and date series.

Simple auto-fill features do not properly predict the complex series in section 406 shown in cells C1:D5. The user may be trying to convert name formats from an order of first name, middle name, and last name to last name, first name, and optionally middle name. The user is incorrectly provided the names shown in section 408 which are an exact copy of some cells in section 406.

Content prediction methods may be used to correctly fill/format cells C15:D19 shown in section 410. Content prediction logic, such as content prediction logic 310 of FIG. 3 may be used to properly convert the cells of section 406 to the cells of section 410.

Content prediction may be used for any number of cell formats. The following examples are meant only to provide examples and not to limit the infinite type of content prediction analysis that may be implemented. For example, content prediction logic may be used to format a telephone number across a series, such as 800-555-1212, 1-800-555-1212, and (800) 555-1212 to a common format. For example, a user database accessing the document may require that all phone numbers be in the format 800.551.1212. In another example, a series of telephone numbers that include seven digits may be appended to include a local area code. The content prediction may optionally skip numbers that fall outside the pattern. The pattern may even be responsive to system settings, such as the area code and preferred formats.

In another example, content prediction based on regular expression analysis may be used to change a list of song names such as "Def Leppard—Armageddon It" to "Def Leppard" in a first column and "Armageddon It" in a second column corresponding to a band name and song name respectively.

Specific cell programming may be able to do a text-to-column conversion using the hyphen as a delimiter, but this takes extra steps and time and mishandles song titles that have hyphens, such as "Simon & Garfunkel—Scarborough Fair—Canticle." Content prediction may be used to quickly evaluate the regular expression in formatted cells in order to apply the pattern to other cells.

In another example, content prediction based on regular expression analysis may be used to remove a number from a list of items in a column, such as "1. Item", "2. Price", "3. Size" . . . "167. Entry". Content prediction may be used to remove the number and period from each entry in the list so that the cells appear as "item", "price", "size", and "entry" respectively.

In another example, the user may format the first row of a table with a black background and bolded red text. Regular expression content prediction may be used to apply the same format to user selected cells in different tables. The content prediction may be used to format the entire table contents or only selected cells. As a result, users who do not use style formatting may be able to benefit from content prediction as implemented in the illustrative embodiments.

Content prediction may be performed by modifying the format of a structure type, such as the first row of cells in a table in a word processing document. The same formatting may then be applied to all cells in various tables. Using regular expression analysis, a user may easily customize and create content prediction instructions individually or as part of a template.

Figure 5:
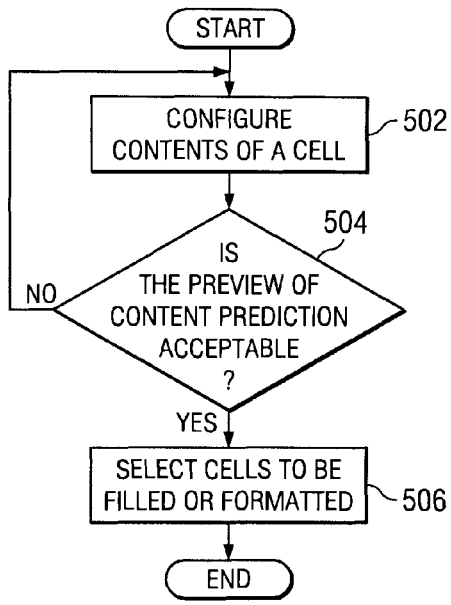
FIG. 5 is a flowchart illustrating user interaction for content prediction based on regular expression pattern analysis in accordance with an illustrative embodiment.

FIG. 5 is a flowchart illustrating user interaction for content prediction based on regular expression pattern analysis in accordance with an illustrative embodiment. The process of FIG. 5 may be performed by a user, such as user A 302 of FIG. 3. The user may enter information into a document editor program, such as document editor program 306 of FIG. 3. Cells filled or formatted using content prediction based on regular expression analysis may be portions of a document, such as document 314 of FIG. 3.

The process begins as the user configures the contents of a cell (step 502). The user may configure sample cells, such as cells shown in section 406 of FIG. 4. The user may use any number of editor tools, such as cut, paste, bold, and underline to configure the sample cell. Alternatively, the user may type the desired format over the contents of the previous cell. In one embodiment, the user may highlight the cell or cells being edited to indicate that the user would like to use content prediction. Step 502 may be performed after the contents of the cell have already been entered.

Next, the user determines if a preview of content prediction is acceptable (step 504). The preview of content prediction may be presented to a user based on the regular expression analysis performed on the cell configured in step 502. The preview may be visually or audibly displayed to the user or may be an audio-visual combination. For example, the user may use the mouse to show fill areas wherein the preview indicates what the cell will look like if the content prediction is accepted. If the preview is not acceptable, the user configures the contents of another cell (step 502). Cells are configured until the preview of content prediction is acceptable. Predictive accuracy improves for a larger set of configured cells.

If the preview of content prediction is acceptable in step 504, the user selects cells to be filled or formatted (step 506) with the process terminating thereafter. In step 506, the user may have previously selected the cells to be reformatted and step 506 may confirm that the user wants the changes to be implemented.

Figure 6:
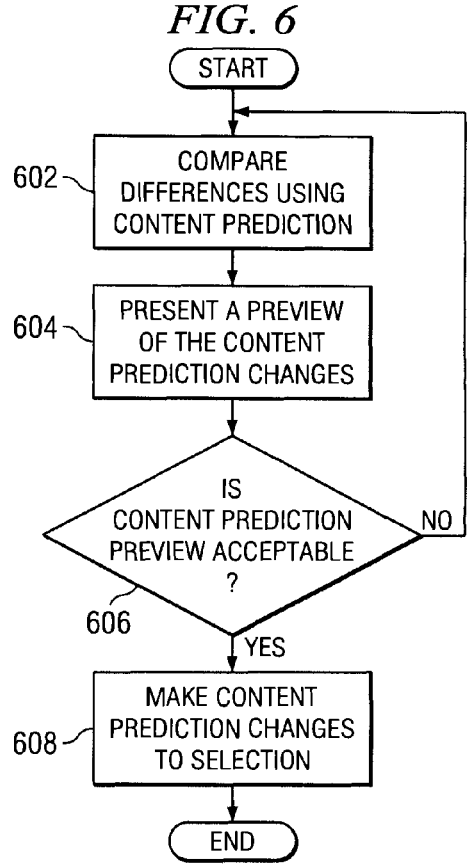
FIG. 6 is a flowchart illustrating content prediction based on regular expression pattern analysis in accordance with an illustrative embodiment.

FIG. 6 is a flowchart illustrating content prediction based on regular expression pattern analysis in accordance with an illustrative embodiment. The process of FIG. 6 may be implemented by a document editor program in content prediction logic, such as document editor program 306 and content prediction logic 310 of FIG. 3 respectively. Cells filled or formatted using content prediction based on regular expression analysis may be portions of a document, such as document 314 of FIG. 3.

The process begins by comparing differences using content prediction (step 602). Step 602 may be performed in response to receiving a user configuration of the contents of a cell(s) in a step, such as step 502 of FIG. 5. Step 602 may be performed in response to a user pressing the enter key or otherwise leaving the cell indicating that the existing data in the cell or sample set has been replaced with the new format or target set. Next, the process presents a preview of the content prediction changes (step 604). The process may present the preview for any number of cells, including cells highlighted or otherwise marked by the user.

Next, the process determines if the content prediction preview is acceptable (step 606). The determination of step 606 may be made based on feedback from a user in a step or determination, such as step 504 of FIG. 5. The user is in the best position to determine if the preview is acceptable, and if the preview is acceptable, the process makes the content prediction changes to the selection (step 608) with the process terminating thereafter. The content prediction changes may be made for a user selected group of cells indicated in a step, such as step 506 of FIG. 5. The changes made in step 608 may be implemented in cells, such as cells shown in section 410 of FIG. 4.

If the process determines the content prediction preview is not acceptable in step 606, the process compares differences using content prediction (step 602). If the preview is not acceptable, the user preferably configures another cell or multiple cells so that multiple sample cells may be used to determine the regular expression differences increasing predictive accuracy.

Figure 7:
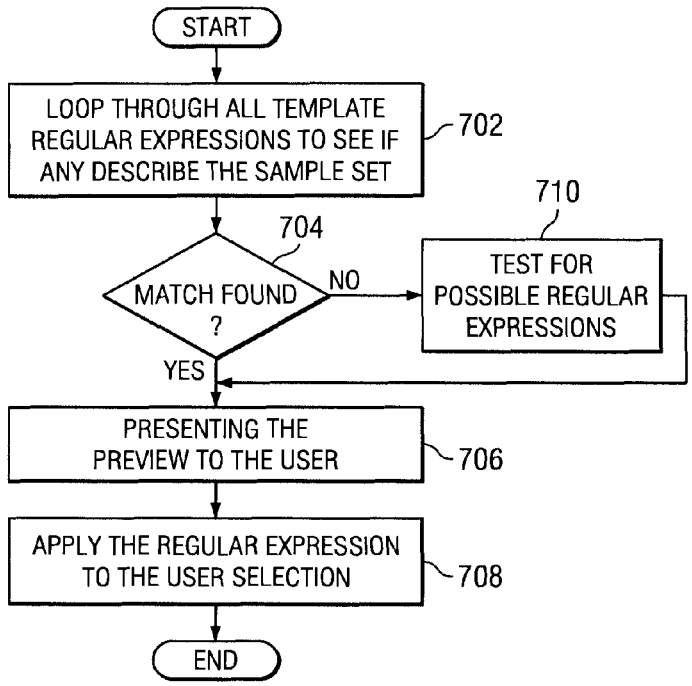
FIG. 7 is a flowchart illustrating content prediction based on regular expression analysis in accordance with an illustrative embodiment.

FIG. 7 is a flowchart illustrating content prediction based on regular expression analysis in accordance with an illustrative embodiment. FIG. 7 may be implemented by content prediction logic in a document editor program, such as content prediction logic 310 and document editor program 306 of FIG. 3. There are numerous methods and steps that may be used to assign a regular expression that matches the values in a series. Different data may be used by the content prediction logic to generate the regular expression.

The data may be cells such as those shown in section 406 of FIG. 4. The first set of data may show the desired content prediction or change from an original cell or sample set of cells to a modified cell or target set of cells. The sample set of cells shows how the data is originally presented and the target set of cells shows how the user wants the cell to be formatted and presented to the user. Multiple sample cells and target cells may be used to more accurately generate a regular expression for effective content prediction. The second set of data may be the user selected cells or data to be changed to the modified format based on the expression pattern.

The process begins by looping through all template regular expressions to see if any describe the sample set (step 702). For example, the user may have previously formatted or used an expression for formatting phone numbers. Next, the process determines if a match is found (step 704). If a match is found, the process presents a preview to the user (step 706). The preview may show how the sample set would be modified based on the regular expression if accepted.

Next, the process applies the regular expression to the user selection (step 708) with the process terminating thereafter. The user selection indicates which cells and data the user wants formatted. In another embodiment, the process may request user verification that the preview is acceptable before applying the regular expression to the user selection. Additionally, if the preview is not acceptable, the process may request a larger sample data set be used.

If a match is not found in step 704, the process tests for possible regular expressions (step 710). For example, if any numbers in the sample set are incremented, decremented, or follow any numeric sequence, the derived mathematical expression is applied to the target set. Regular expression pattern analysis includes conversion of date and time formats into a date-time code test. Regular expression analysis also evaluates other numeric patterns, such as non-base 10 numbers like binary and hexadecimal. Portions of the cell, as well as the entire cell contents are tested to determine a sequential pattern or repeated pattern. Non-base 10 numbers may be tested by converting the number to an equivalent number in another base and then testing for possible regular expressions in step 710. Additionally, the program may require the user to declare a different base is being used in a dialog box.

Regular expression analysis may also involve conversion of symbols or keywords and is responsive to conversion where symbols or keywords are used. For example, applying currency symbols converting dollars to Euros, $ to C may be performed using regular expression analysis and content prediction. Content prediction logic may also connect to an external source of conversion data or conversion database to carry out the conversion of the target set. The conversion database includes information about data configuration, rules, mathematical expressions and patterns, and conversion information for changing data from one form to another. For example, the conversion database may be accessed by the content prediction logic for converting from English measurements to metric measurements. In another example, an online database with grammar, sayings, and phrases of common usage may be accessed to determine whether a cell is improperly formatted. For example, use of the catch phrase "D'oh" in a cell may be marked as misspelled even though the term may be properly used for those familiar with the television show, The Simpsons.

Conversion logic may also be incorporated into the content prediction logic for conversions such as Fahrenheit to Celsius, weights, measures, and volumes without requiring connection to an external source of data. In another embodiment, the user may supply a conversion table which may typically be used to format cells by selecting two columns of data to convert.

Step 710 may also perform a word-to-word comparison followed by a character-to-character comparison to determine if any words or characters have been re-arranged or reversed. Step 710 may also compare inserted, deleted, or modified characters. In addition, the document editor program may alert the user if there is data that does not appear to follow the format of the sample set. In the case of anomalous data, the user may modify the regular expression by providing the solution for unknown or unacceptable target set solutions.

The document editor program may also prompt the user to save the regular expression as an instruction, setting, preference, or template. After performing step 710, the process presents the preview to the user (step 706) before applying the regular expression to the target set (step 708).

Figure 8:
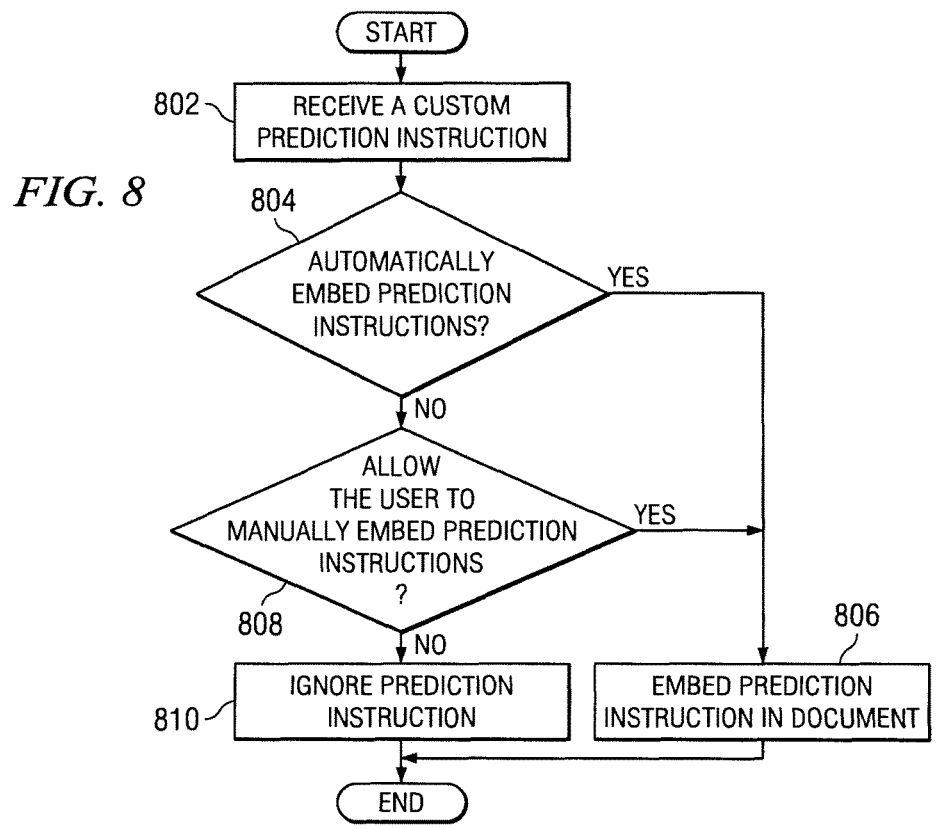
FIG. 8 is a flowchart for embedding prediction instructions in a document in accordance with an illustrative embodiment.

FIG. 8 is a flowchart for embedding prediction instructions in a document in accordance with an illustrative embodiment. The process of FIG. 8 may be implemented by content prediction logic of a document editor program, such as content prediction logic 310 and document editor program 306 of FIG. 3 respectively. The content prediction instructions may be stored within embedded content prediction instructions in a document, such as embedded content prediction instructions 316 and document 314 of FIG. 3. The content prediction logic may rely on user input from a user such as user A 302 of FIG. 3.

Developers and users may define, save, and modify regular expression matches as a template to ensure the accuracy of future prediction. Additionally, when documents with embedded content prediction instructions are shared, the user may build on the instructions embedded in the document and/or absorb the content prediction instructions into the user's template of content prediction logic.

The embedded content prediction instructions may also incorporate other user-defined prediction preferences such as type-ahead, typo-fix, user dictionary entries, custom grammar rules, and other custom configurations. Spell checking is a type of content prediction which seeks to predict the likelihood of a word being correctly spelled and predict alternatives. For example, the correct spelling of the name "Jon Bon Jovi" mistakenly shows up as a misspelling when the document is viewed by another user. Because many document editor programs highlight terms considered mistyped or misspelled, the user receiving the document may be distracted from the content of the document. Custom terms such as the name "Jon Bon Jovi" may be added to one user's dictionary and temporarily or permanently accepted into another user's dictionary within the user content prediction logic. The custom term "Jon Bon Jovi" may be included within the embedded content prediction instructions of a document or may be sent in a content prediction template to another user.

The content prediction logic may also include custom grammar rules. Custom grammar rules are especially important in a specialized field or culture which may use sentence structure and grammar that is traditionally incorrect. One example of this comes out of a sub-culture of the Internet where people use, "All your base are belong to us" in a document and other modifications meant for humor such as, "All your database are belong to us." This is a purposeful butchering of English grammar used as an "inside joke" for those with the knowledge of the phrase origin. A user including this text in a document may want to pass along this phrase without the phrase being marked as grammatically incorrect by the document editor program used to create or read the document.

The process of FIG. 8 begins by receiving a customized prediction instruction (step 802). The customized prediction instruction of step 802 may be received after a user has customized a content prediction instruction. For example, the user may format a cell to alphabetize and color coordinate a list of cartoon names. The user has created, customized, or added the content prediction instruction to a document or template. Next, the process determines whether to automatically embed prediction instructions (step 804). The determination of step 804 may be based on a user selection. In step 804, the user may select to automatically embed all instructions or a type of content prediction instructions. The type of content prediction instructions correspond to predictions in the content prediction logic, such as content prediction logic 310 of FIG. 3.

For example, the user may select to automatically embed all prediction instructions relating to custom grammar rules. In another example, the user may select to import the content prediction instructions relating to a desired phone number format. If the process determines to automatically embed instructions, the prediction instructions are embedded in the document (step 806) with the process terminating thereafter.

If the process determines not to automatically embed the instructions in step 804, the process determines whether to allow the user to manually embed prediction instructions (step 808). The determination of step 808 may be based on a user selection. For example, the user may select to manually embed all instructions or to manually embed the instructions by the type of content prediction instructions. If the process determines to manually allow the user to embed the prediction instructions, the process embeds prediction instructions in the document (step 806). The prediction instructions embedded in step 806 may be specifically designated by a user.

In one example, the document editor program may prompt the user to manually embed the prediction instructions upon creation of the prediction instruction when saving, closing, or upon a manual request by the user. For example, if the user uses a mouse to select a menu option, clicks a content prediction, icon, or otherwise indicates that the content prediction instruction should be saved, the user may be prompted to manually embed the prediction instructions.

If the process determines not to manually allow the user to embed prediction instructions, the process ignores prediction instructions (step 810) with the process terminating thereafter.

Figure 9:
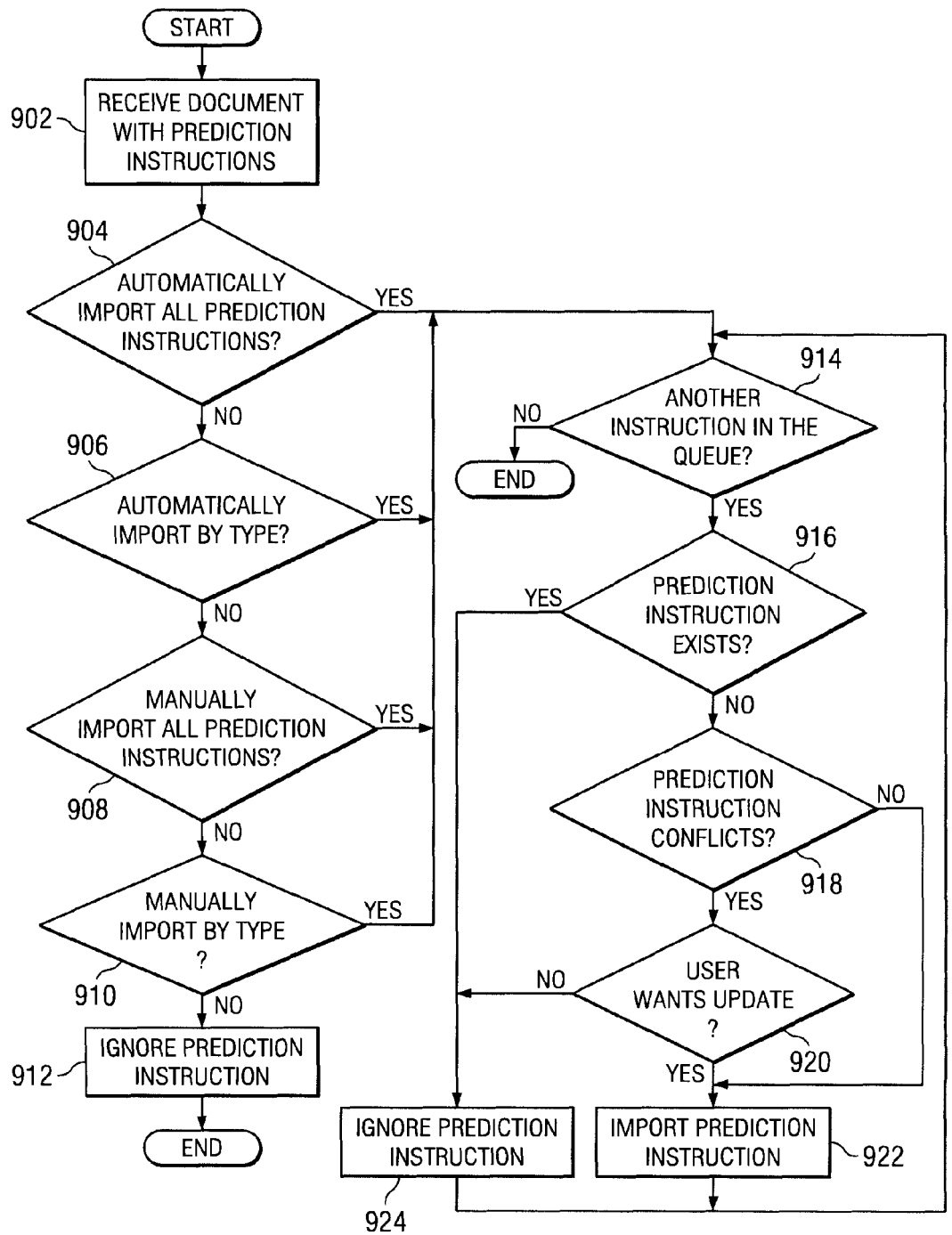
FIG. 9 is a flowchart for importing prediction instructions in a document in accordance with an illustrative embodiment.

FIG. 9 is a flowchart for importing prediction instructions in a document in accordance with an illustrative embodiment. The process of FIG. 8 may be implemented by content prediction logic of a document editor program, such as content prediction logic 312, and document editor program 308 of FIG. 3 respectively.

The process begins by receiving a document with prediction instructions (step 902). The prediction instructions may be been previously added or customized by a user. The determinations of steps 904-910 may be made based on user input from a user such as user B 304 of FIG. 3. The user may be prompted within the document editor program to establish how prediction instructions are imported.

Next, the process determines whether to automatically import all prediction instructions (step 904). If the process determines not to automatically import all, the process determines whether to automatically import by type (step 906). If the process determines not to automatically import by type, the process determines whether to manually import all prediction instructions (step 908). If the process determines not to manually import all prediction instructions, the process determines whether to manually import by type (step 910). If the process determines not to manually import by type, the process ignores prediction instructions (step 912).

If the process selects to automatically import all (step 904), automatically import by type (step 906), manually import all (908), or manually import by type (step 910), the process determines if there is another instruction in the queue (step 914). The queue is a queue within the content prediction logic used to hold content prediction instructions. Instructions in the queue may be permanently accepted or temporarily accepted. The instructions are stored such that if one content prediction instruction is removed or assigned, the next prediction instruction moves to the top of the queue. If there is not another instruction in the queue, the process terminates.

If there is another instruction in the queue in step 914, the process determines if the prediction instruction exists (step 916). The process checks to see if the prediction instruction exists to avoid redundant content prediction instructions. If the prediction instruction does not exist, the process determines if there are prediction instruction conflicts (step 918). If there are prediction instruction conflicts, the process determines whether the user wants the update (step 920). For example, the content prediction instruction may suggest a format different from a previously saved content prediction instruction. As a result, the user may need to determine whether both instructions should be saved, or if one should be saved and another deleted or modified. If the process determines the user wants the update, the process imports the prediction instruction (step 922). Next, the process determines if there is another instruction in the queue (step 914).

If the process determines the user does not want the update in step 920, the process ignores the prediction instruction (step 924) before determining if there is another instruction in the queue (step 914). In step 924 the prediction instruction is ignored and removed from the queue so that the remaining instructions may be processed. If the prediction instruction does not conflict in step 918, the process imports the prediction instruction (step 922). If the process determines the prediction instruction exists in step 916, the process ignores the prediction instruction (step 924).

FIG. 9 ensures that content prediction instructions are imported without redundancies or conflicts. Additionally, user feedback, inputs, and preferences are used to determine how content prediction instructions are imported. The user may also select to accept content prediction instructions or templates only temporarily for a specified period or while working on a certain document. As a result, the user is not forced to permanently accept instructions that the user may find only temporarily useful or needed.

Thus, the illustrative embodiments provide an improved computer implemented method, apparatus, and computer usable program code for content prediction based on regular expression analysis. Users are not required to use scripting to perform complex prediction which is beyond most people's skills or requires excessive time to write a unique script for each situation. The illustrative content prediction embodiments allow features, and formats of cells in a document may be updated by a developer, user, or automatically based on user actions. The content prediction selections may be saved in a content prediction template. The content prediction template may be shared between users temporarily or permanently, updated, and edited at will allowing users to quickly and easily format and fill cells in a document. Content prediction instructions may be embedded in a document and imported by other users as specified by the user. Content prediction based on regular expression analysis present data in a uniform format that may be more easily used by users.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for embedding content prediction instructions in a document while the document is being edited by a user, the method comprising:
   customizing a content prediction instruction using content prediction logic of a document editor program;
   determining a regular expression that describes differences between content for a plurality of cells associated with the document; and
   embedding, by a computer, the content prediction instruction in the document being edited by the user, wherein the content prediction instruction is customized based on the regular expression.

2. A computer system for processing a document editor program, the computer system comprising:
   a processor, a computer readable memory and a non-transitory computer readable medium;
   first program instructions to load the document editor program from the non-transitory computer readable medium into the computer readable memory for execution by the processor, wherein the document editor program includes content prediction logic, wherein the content prediction logic comprises second program instructions to receive a user input from a user to select a plan for importing content prediction instructions contained in a received document, third program instructions to determine if there is a content prediction instruction of the content prediction instructions in a queue, fourth program instructions to determine if the content prediction instruction already exists in the content prediction logic, fifth program instructions to determine if there are prediction instruction conflicts between the content prediction instruction and an existing prediction instruction maintained by the content prediction logic, sixth program instructions to receive a user update input to update the content prediction logic, and seventh program instructions to import the content prediction instruction into the content prediction logic, and wherein the first, second, third, fourth, fifth, sixth and seventh program instructions are stored on the non-transitory computer readable medium for execution by the processor via the computer readable memory.

3. The system of claim 2, wherein the document editor program includes a template, wherein the content prediction instructions are imported into the template.

4. The system of claim 3, wherein the content prediction logic is stored in the template.

5. The system of claim 2, wherein the queue holds the content prediction instructions such that when one content prediction instruction is removed or assigned, a next content prediction instruction moves to top of the queue.

6. A computer program product comprising a non-transitory computer readable medium including computer readable program code for importing content prediction instructions, said computer readable program code including:
 computer readable program code for receiving a user input from a user to select a plan for importing content prediction instructions contained in a received document;
 computer readable program code for determining if there is a prediction instruction of the content prediction instructions in a queue;
 computer readable program code for determining if the content prediction instruction already exists in content prediction logic associated with the user;
 computer readable program code for determining if there are prediction instruction conflicts between the content prediction and an existing prediction instruction maintained by the content prediction logic associated with the user;
 computer readable program code for receiving a user update input from the user to update the content prediction logic; and
 computer readable program code for importing the content prediction instruction into the content prediction logic.

7. The computer program product of claim 6, wherein the computer usable program code for importing further comprises:
 computer usable program code for adding the content prediction instruction to the content prediction logic of the user, wherein the content prediction instruction is based on a regular expression that expresses differences between content for a plurality of cells associated with the document.

8. The computer program product of claim 7, wherein the computer usable program code for adding comprises:
 computer usable program code for receiving update preferences from the user that allow the user to temporarily accept the content prediction instruction for use with the document.

9. The computer program product of claim 6, wherein the update preferences allow the user to select between temporarily or permanently accepting the content prediction instruction for use with the document, allow the user to select between automatically or manually adding the content prediction instructions in the document to the content prediction logic and allow the user to select between adding the content predictions instructions by individual content prediction instructions, type of content prediction instructions, or all content prediction instructions.

10. The computer program product of claim 6, wherein the queue holds the content prediction instructions such that when one content prediction instruction is removed or assigned, a next content prediction instruction moves to top of the queue.

11. A system for sharing content prediction instructions, the system comprising a data processor coupled to a memory having program code stored therein that is configured to perform steps of:
 customizing a content prediction instruction of the content prediction instructions using content prediction logic associated with a first user;
 determining a regular expression that describes differences between content for a plurality of cells associated with a document;
 embedding the content prediction instruction in the document while the document is being edited by the first user;
 receiving a user input from a second user to select a plan for importing the content prediction instructions;
 determining if there are prediction instruction conflicts between the content prediction instruction and an existing content prediction instruction that is part of content prediction logic associated with the second user;
 receiving a user update input from the second user to update the content prediction logic; and
 importing the content prediction instruction, wherein the importing comprises adding the content prediction instruction to the content prediction logic of the second user, wherein the content prediction instruction is customized based on the regular expression.

12. The system of claim 11, wherein the adding comprises receiving update preferences from the second user.

13. The system of claim 12, wherein the update preferences comprise:
 allowing the second user to temporarily or permanently accept the content prediction instruction for use with the document;
 allowing the second user to automatically or manually add the content prediction instructions in the document to the content prediction logic; and
 allowing the second user to add the content predictions instructions by any of all content prediction instructions, individual content prediction instructions, or type of content prediction instructions.

14. The system of claim 11, wherein a queue holds the content prediction instructions such that when one content prediction instruction is removed or assigned, a next content prediction instruction moves to top of the queue.

15. A method for importing content prediction instructions by a computer, the computer performing steps of:
 receiving a document with the content prediction instructions;
 responsive to receiving the document with the content prediction instructions, receiving a user input from a user to select a plan for importing the content prediction instructions;
 responsive to receiving the user input to select the plan for importing the content prediction instructions, determining if there is a content prediction instruction of the content prediction instructions in a queue;

responsive to determining that the content prediction instruction is in the queue, determining if the content prediction instruction already exists in content prediction logic associated with the computer;

responsive to determining that the content prediction instruction does not already exist in the content prediction logic, determining if there are prediction instruction conflicts between the content prediction instruction and an existing prediction instruction maintained by the content prediction logic associated with the computer;

responsive to determining that there are prediction instruction conflicts between the content prediction instruction and the existing prediction instruction, receiving a user update input to update the content prediction logic; and responsive to receiving the user update input to update the content prediction logic, importing the content prediction instruction into the content prediction logic, wherein the queue holds the content prediction instructions such that when one content prediction instruction is removed or assigned, a next content prediction instruction moves to top of the queue.

* * * * *